2,752,385

QUATERNARY AMMONIUM SALTS OF ALKYL (HYDROXYALKYL) AMINOALKYL BENZILATES AND ESTERS THEREOF

John W. Cusic, Skokie, and Richard A. Robinson, Morton Grove, Ill., assignors, by mesne assignments, to G. D. Searle & Co., Skokie, Ill., a corporation of Delaware No Drawing. Application January 15, 1953, Serial No. 331,513

7 Claims. (Cl. 260—473)

This invention relates to quaternary ammonium salts of alkyl(hydroxyalkyl)aminoalkyl benzilates, to derivatives thereof and to the production of such compounds. More particularly this invention relates to compounds of the following general structural formula

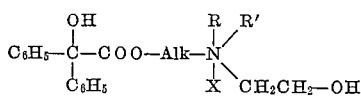

wherein Alk is a lower alkylene radical containing at least 2 and not more than 4 carbon atoms, R and R' are lower alkyl radicals containing not more than 3 carbon atoms, and X is one equivalent of an anion.

In the compounds of the foregoing formula Alk represents bivalent radicals derived from saturated aliphatic hydrocarbon atoms containing 2 to 4 carbon atoms and includes such radicals as ethylene, propylene, butylene, trimethylene and tetramethylene. The radicals R and R' represent such lower alkyl radicals as methyl, ethyl, propyl, and isopropyl. The substituent X is one equivalent of an anion and includes such non-toxic anions as chloride, bromide, iodide, methyl sulfate, ethyl sulfate, benzenesulfonate, toluenesulfonate, tartrate, succinate, citrate, sulfate, phosphate, and the like.

The compounds of this invention as described above are useful in medicine as anticholinergic agents. They have the property of blocking or inhibiting the transmission of nerve impulses across ganglia, parasympathetic myoneural junctions and skeletal myoneural junctions. These compounds are soluble in water and in aqueous solutions of alcohols and other water-soluble organic solvents. They may be administered in the form of aqueous solutions or in solid form as tablets or capsules.

The quaternary ammonium salts which comprise this invention are conveniently prepared by reacting a basic ester of the formula

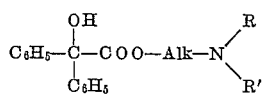

wherein Alk, R and R' have the meanings given hereinabove, with an ethylene halohydrin or a lower alkanoic acid ester thereof.

These reactions are preferably carried out at elevated temperatures in the range of 50–150° C. in inert solvents such as acetone, methyl ethyl ketone, methanol, ethanol, isopropanol, chloroform, or nitromethane. Lower temperatures between 0° and 50° C. are also satisfactory. Generally the reactions are carried out in a closed system if a lower alkyl halide is used as one of the reagents. With higher boiling reagents the reactions may be carried out in open systems at reflux temperature. In most instances the quaternary ammonium salt crystallizes from the cooled reaction mixture and may be isolated by filtration. In some instances it may be necessary to precipitate the salt by the addition of a solvent such as ether or a low-boiling hydrocarbon in order to lower the solubility of the salts in the reaction mixture. The salts may be further purified by recrystallization from suitable solvents.

In the event that salts are desired in which the anion represented by X is other than a halide ion, the halide ion may be interchanged by reaction of the quarternary ammonium salt with a heavy metal salt of an acid providing the appropriate anion. For example halide ions may be replaced by tartrate ions by reaction with silver tartrate. Likewise citrate, nitrate, malate and other ions described above can be introduced by use of silver citrate, silver nitrate, lead malate and similar salts. These reactions are carried out by agitating the reagents in aqueous solvents such as dilute alcohol or dilute acetone. The heavy metal halides are then removed by filtration and the quarternary ammonium salts are isolated by evaporation of the filtrate.

Our invention is disclosed in further detail by the following examples which are representative of methods of preparing the compounds within the scope of this invention but which are not to be construed as limiting the invention in spirit or in scope. Relative amounts of materials are given in parts by weight and temperatures are recorded in degrees centigrade (° C.).

Example 1

299 parts of β-dimethylaminoethyl benzilate and 187 parts of ethylene bromohydrin in 800 parts of methyl ethyl ketone are refluxed for 2 hours and then allowed to stand for 60 hours at 0° C. The crystals of β-(β-hydroxyethylmethylamino)ethyl benzilate methobromide are separated and dried. They melt at 122–125° C. The salt has the formula

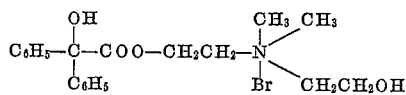

Example 2

80 parts of β-dimethylaminoethyl benzilate and 80 parts of β-bromoethyl acetate in 400 parts of methyl ethyl ketone are refluxed for 15 hours. The solution is cooled and diluted with ether. The precipitate is separated and dissolved in a hot mixture of ethyl acetate and isopropanol. On chilling crystals of β-(β-acetoxyethylmethylamino)-ethyl benzilate methobromide slowly separate. After recrystallization from a mixture of ethyl acetate and isopropanol they melt at 97–99° C. The salt has the formula

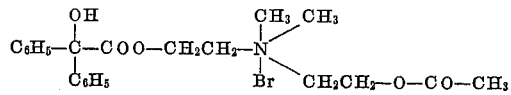

Example 3

A. 34 parts of sodium are dissolved with heating in 4000 parts of isopropanol. Then 255 parts of β-N-pyrrolidinoethyl chloride hydrochloride are added, followed by 342 parts of benzilic acid. The mixture is refluxed and agitated for 4 hours, then evaporated to remove most of the solvent. To the residue are added ether and dilute caustic soda solution. The ether layer is separated, washed with water, dried and evaporated. There is thus obtained about 310 parts of β-N-pyrrolidinoethyl benzilate as a nearly colorless solid. This ester can be recrystallized from alcohol or from methyl ethyl ketone, and melts at 93–94° C.

B. 80 parts of β-N-pyrrolidinoethyl benzilate are dissolved in 600 parts of methyl ethyl ketone. The solution is chilled and methyl bromide gas is passed in until 80 parts are taken up. A heavy precipitate forms immediately upon the addition of the methyl bromide. The mass is kept at about 0° C. for 15 hours. The β-N-pyrrolidinoethyl benzilate methobromide is collected on a filter, washed with cold methyl ethyl ketone, and dried. This salt melts at about 205° C.

We claim:
1. A quaternary ammonium salt of the formula

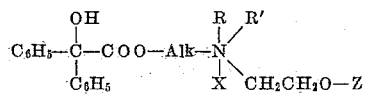

wherein Alk is an alkylene radical containing at least 2 and not more than 4 carbon atoms, R and R' are alkyl radicals containing not more than 3 carbon atoms, X is one equivalent of an anion and Z is selected from the group consisting of hydrogen and lower alkanoyl radicals.

2. A quaternary ammonium salt of the formula

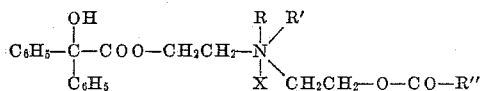

wherein R, R' and R'' are alkyl radicals containing not more than 3 carbon atoms and X is one equivalent of an anion.

3. A quaternary ammonium salt as in claim 2 wherein R, R' and R'' are methyl radicals.

4. The quaternary ammonium salt as in claim 3 wherein X is bromide.

5. A quaternary ammonium salt of the formula

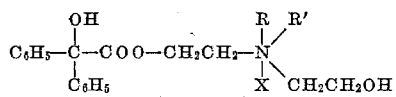

wherein R and R' are alkyl radicals containing not more than 3 carbon atoms and X is one equivalent of an anion.

6. A quaternary ammonium salt as in claim 5 wherein R and R' are methyl radicals.

7. The quaternary ammonium salt as in claim 6 wherein X is bromide.

References Cited in the file of this patent
UNITED STATES PATENTS
2,399,736   Holmes et al. _____ Feb. 12, 1946

OTHER REFERENCES
Jensen et al.: Acta Chemica Scandinavica 2 381–383 (1948).